United States Patent Office 2,956,990
Patented Oct. 18, 1960

2,956,990

PROCESS OF POLYMERIZING ESTER OF ACRYLIC OR METHACRYLIC ACIDS

Robert C. Fettes, Feasterville, Pa., assignor to Rohm & Haas Company, Philadelphia, Pa., a corporation of Delaware No Drawing. Filed Apr. 4, 1957, Ser. No. 650,553

10 Claims. (Cl. 260—89.5)

This invention concerns a method for polymerizing esters of methacrylic acid, particularly lower alkyl methacrylates, and other vinylidene compounds of similar e values, such as alkyl acrylates, to give polymers of a reproducible range of molecular weights and of a molecular size which is particularly favorable for specific applications, as in molding or coating, where a peculiar combination of properties may be necessary for optimum use.

Sodium and potassium salts which have been shown to be anionic polymerization initiators give polymers of methacrylates and acrylates which are low in molecular weight and tend to be somewhat variable from batch to batch. For example, methyl methacrylate when treated with a sodium or potassium polymerization catalyst gives polymers which have molecular weight below 80,000, even when optimum conditions are arranged with respect to concentration of catalyst, solvent, concentration of monomer, temperature, and other environmental factors. Ethyl acrylate when polymerized under the influence of sodium or potassium salt initiators gives viscous liquids.

In contrast to these well established facts, a way has now been found of providing polymers of acrylic and methacrylic esters which are of markedly higher molecular weight than provided by sodium or potassium catalysts, yet not of such high molecular weights as to cause difficulties in such practical operations as molding or extruding.

It has been discovered that a mixture of sodium or potassium with lithium, calcium, strontium, or barium in the form of their salts of a Lewis acid having a pKa value from about 16 to 36 and in the absence of a chain transfer agent initiates polymerization of esters of methacrylic acid and comparable polymerizable vinylidene compounds and provides polymers of moderately large molecular size. Furthermore, by adjusting the ratio of (a) sodium or potassium to (b) lithium, calcium, strontium, or barium in the catalyst, one can vary molecular sizes of the resulting polymer within the limits in which an optimum balance of properties of the polymers is obtained for such uses as molding, extruding, coating, or other specialized application.

My process for forming polymers of controlled molecular weight between about 90,000 and about 1,000,000 comprises polymerizing in an inert solvent under anhydrous conditions below 0° C. an ester of an acid from the class consisting of acrylic and methacrylic acids and of an alcohol having a residue from the class consisting of alkyl groups of not over eight carbon atoms, alkenyl groups of three to eighteen carbon atoms, benzyl groups, phenyl groups, and alicyclic hydrocarbon groups particularly up to ten carbon atoms under the influence of a mixture of polymerization catalysts, the catalytic mixture containing an alkali metal catalyst having an atomic weight of at least twenty-three and a second catalyst, in the previously-defined salt form, of lithium, calcium, strontium, or barium, the ratio of the said alkali metal catalyst to the second catalyst being adjusted to give polymers of molecular weights higher than obtained from sodium or potassium metal catalysts alone.

Ratios of the two classes of metal catalysts (a) and (b), which give the desired range of molecular weights, which we here call molecular weights of intermediate size, vary somewhat with the kind of ester to be polymerized and with the nature of the kinds of metal compounds used. When metal salts of Lewis acids are taken or prepared in situ, useful ratios fall in the range of 0.6:1 to 0.1:1 (K or Na to Li, Ca, Sr, or Ba) on an atom to atom basis when one deals with esters of methacrylic acid, such as methyl, ethyl, propyl, or butyl methacrylate. When the mixture of salts of Lewis acids is applied to esters of acrylic acid, the sodium or potassium should be in excess of the lithium, calcium, strontium, or barium. Here, the ratio on an atom to atom basis falls in a range from 10:1 to 1:1 with preferred ratios from 6:1 to 4:1. This is in contrast to the preferred ratios of 0.5:1 to 0.2:1 when methacrylates are to be polymerized.

Some variations of these several ratios arise when one of the metals is supplied by an anhydrous salt of a strong inorganic acid, such as hydrochloric. Then ratios both higher and lower may be found desirable, depending on the total system.

A convenient way to prepare the initiator system is to disperse the two classes of metals in an inert solvent in which the polymerization may be performed. The mixture is then treated with small increments of a Lewis acid until the color of the metal dispersion is gone.

For example, there are mixed 0.013 part by weight of sodium metal and 0.011 part by weight of lithium metal in 30 parts of liquid ammonia at −70° C. The mixture is stirred. Small increments of methyl isobutyrate are added to the stirred mixture until the blue color disappears. This provides an initiator system which effectively polymerizes methacrylic esters and similar vinylidene monomers to polymers of moderately high molecular weights.

Another way of preparing an initiator system for use in preparing polymers according to this invention is to mix sodium or potassium with a dry, soluble salt of lithium, calcium, strontium, or barium and a strong inorganic acid or to mix lithium, calcium, strontium, or barium metal with a dry, soluble salt of sodium or potassium. The criterion for solubility is the solubility of these inorganic salts in water. The mixture is titrated with a Lewis acid of pKa 16 to 36 until the color from the free metal has disappeared. The mixing is done in an anhydrous inert solvent in which polymerization may be performed.

Perhaps, the best way of combining these particular materials to prepare the initiating system is to mix one kind of metal in a solvent, titrate with a Lewis acid, and then add a salt of the other class of metal to give the desired ratio of the two classes of metals, at least one of the salts being that of a Lewis acid.

The Lewis acid used in forming the initiator system must have a pKa value from 16 to 36. Typical substances giving these values are listed by Hammett in Physical Organic Chemistry, McGraw-Hill Book Co., New York, 1940. The basicity of the salts of Lewis acids increases as the pKa value increases, initiating activity tending to increase with basicity. The salts of Lewis acids may be prepared as shown above or they may be prepared independently of the solvent system in which they are to be used, provided that a free Lewis acid is not present in an amount to act as a chain terminator. It is thus necessary in the case of the preparation of salts of the relatively stronger Lewis acids to use methods of preparation which avoid giving any appreciable concentration of the free Lewis acid. For instance, in preparing an alkoxide it is desirable not to use a free alcohol, but to use an anhydrous alkyl carboxylate which then provides the alkoxide by saponification with the metal. Water must, of course, be avoided, also free alkanol, since these can act as chain terminators. There can be used, for example, methyl crotonate, methyl isobutyrate, n-butyl acetate, or propionate, or diethyl malonate, as typical esters for titrating the metal or metals. There may also be used metal aryls, such as phenyl sodium or fluorenyl lithium, metal aralkyls, metal amides, metal diphenylamides, metal indenyls, etc.

The preferred type of polymerizable vinylidene compound comprises esters of methacrylic acid and such alcohols as methyl, ethyl, propyl, isopropyl, butyl, isobutyl, sec-butyl, tert-butyl, amyl, hexyl, octyl, nonyl, or decyl (as typical alkanols), allyl, methallyl, undecenyl, dodecenyl, or octadecenyl (as typical alkenols), cyclopentyl, dicyclopentyl, cyclohexyl, methylcyclohexyl, trimethylcyclohexyl, butylcyclohexyl, or terpenyl (as typical alicyclic alcohols), benzyl, methylbenzyl phenylethyl, dimethylbenzyl (as typical aralkanols), phenyl, chlorophenyl, methylphenyl, dimethylphenyl, tert-butylphenyl (as typical ester-forming phenols), tetrahydrofurfuryl, or methoxyethyl, ethoxyethyl, ethoxypropyl, butoxyethyl, ethoxyethoxyethyl, benzoxyethyl, phenoxyethyl, butylphenoxyethyl, cyclohexoxyethyl, or other alcohol residues which have other than hydrocarbon residues and which are free of reactive hydrogen. Alcohols having amino groups are likewise of interest, such as N,N-dimethylaminoethanol, N-tert-butylaminoethanol, N-tert-octylaminoethanol, 7-amino-3,7-dimethyloctanol, $\beta$-morpholinoethanol, $\beta$-piperidinopropanol, or N,N-diethylaminopropanol. Mixtures of the methacrylates can be used.

In place of the methacrylates there can be used other vinylidene compounds which have an $e$ value between about one-tenth and about one. The $e$ value is a parameter which depends upon the degree of polarity of the monomer double bond. The higher the value of $e$, the more is the double bond polarized and polarized so that the double bond becomes more prone to attach by nucleophilic reagents. Cf. page 91, Alfrey, Bohrer, and Mark, "Copolymerization," Interscience Publishers, Inc., New York, 1952. The higher the $e$ value, the more willing is the polarized double bond to accept an anionic initiator and the less basic need the initiator be. On this $e$ scale methyl methacrylate has an $e$ value of $+0.4$, while methyl acrylate has an $e$ value of $+0.6$.

The vinylidene compounds having proper $e$ values thus include esters of acrylic acid and the list of alcohol residues given above applies also to these. With vinylidene compounds having $e$ values outside of the noted range the effect of the combination of the two kinds of metals does not seem to exert the useful result here described for methacrylates and acrylates.

One or more of these monomers of similar $e$ value is acted upon in a solvent system remaining fluid at low temperatures. Ammonia provides a most important low temperature fluid and may be used as the sole solvent or as one of a mixture of solvents, such as a dry ether or a petroleum ether or an amine such as trimethylamine.

The concentration of monomer may be desirably kept as high as will give a workable stirrable system, but dilute solutions are quite as useful. On a molar basis there is practically used between about 0.05 mole and about five moles of monomer per liter of solvent. The range of 0.05 to 0.5 volume of monomer per volume of solvent is preferred.

The proportion of catalyst mixture used can vary from about 0.01 mole to 0.2 mole of catalyst per mole of monomer or monomers. While a higher proportion of metal to monomer could be used, there is no evident advantage in doing so, although one could use such higher proportion.

Polymerization is carried out below 0° C., usually between $-10°$ and $-90°$ C. and preferably from about $-30°$ to about $-70°$ C.

Polymer and solvent are separated, as by filtering off polymer or evaporating solvent to leave polymer as a residue or precipitating by adding a non-solvent. The polymer is washed with water or alcohol to remove initiator and dried. In some cases it may be desirable to wash with acid in water or alcohol, particularly to remove inorganic residues, which may impart color.

The polymer thus obtained is soluble in typical organic solvents, such as ethyl or butyl acetate, toluene, or chlorinated hydrocarbons, or mixtures of solvents.

The molecular weights of polymethacrylates prepared with the mixed alkali-forming catalysts can be varied within limits of about 90,000 and 1,000,000, depending on the particular ester and the combination of the metals making up the initiator system. The preferred range is between 100,000 and 400,000, since this is the range where valuable properties are developed for many special applications. In the case of polyacrylates molecular weights are also obtained which are considerably higher than result when sodium or potassium initiators are used alone. The range here will also usually be from about 100,000 to 400,000.

An important consideration is that it becomes possible by use of the mixed catalyst systems of this invention to reproduce molecular weights, with greater certainty than heretofore.

The polymers not only fall within the above range of molecular weight range but they are characterized by having a very narrow distribution of molecular weight sizes. Polymers in the viscosity average molecular weight range found useful for a molding or coating composition will thus combine the normal useful flow characteristics of such polymers with an increased toughness caused by the increase in number average molecular weight. Alternatively polymers may be prepared with a number average molecular weight equivalent to that found useful for a molding or coating composition. These latter polymers will then possess lower bulk and solution viscosity resulting in a substantial improvement in ease of forming the material by injection molding, extrusion, or application from solvent solution. Also the polymers so obtained are exceptionally low in monomer content.

An example of this would be a methyl methacrylate prepared by means of this invention to have an intrinsic viscosity in benzene of 0.35 deciliter per gram corresponding to a viscosity average molecular weight of 110,000. Osmotic molecular weight measurements on this sample give a number of average molecular weight of 63,000. The ratio of viscosity average to number average molecular weight is thus 1.75 to 1. The percent of unreacted monomer is 0.5%. By way of contrast a methyl methacrylate polymer prepared by a free radical process to the same viscosity average molecular weight will have a number average molecular weight of 55,000 and hence a ratio of 2.0 to 1. The percent of unreacted monomer is 1½%.

Although it has been stated in the literature with respect to polystyrene that the molecular weight of polymer was independent of the concentration of alkali metal used as catalyst, at least in the range studied, there seems to be a definite increase in molecular weights as the total concentration of the mixed metal initiators is increased.

Further details are given in the examples which follow, these being presented for purposes of illustration and not by way of limitation.

*Example 1*

A two liter glass vessel was equipped for conducting experiments under substantially anhydrous conditions by fitting it with a stirrer and multiple inlet tubes for alkali metals, dry nitrogen, ammonia, salt-forming cocatalyst, and monomer. Also provided was an outlet venting through a drying tube filled with anhydrous silica gel. Prior to operation, the vessel was flushed with dry nitrogen for thirty minutes. Then 0.633 gram of sodium and .545 gram of lithium were weighed out under benzene to minimize formation of oxides and hydroxides. This is a mole ratio of .35 to 1, sodium to lithium. A cooling bath was then placed around the vessel. The coolant consisted of solid carbon dioxide chunks in acetone, giving a bath temperature of −78° C. Anhydrous ammonia was then distilled from a cylinder and condensed in the vessel to a volume of one and one-half liters. A characteristic blue solution resulted. Total alkali metal concentration was .071 mole per liter. Stirring was started. Methyl isobutyrate was added slowly until the blue color disappeared. This required five ml. The resulting solution was clear with small pieces of white solid suspended. There were added 218 grams of methyl methacrylate monomer. The mixture in the vessel turned cloudy white and then chalky white, indicating rapid conversion to polymer. Stirring was continued for one-half an hour. Eight grams of ammonium chloride were added to neutralize any unused initiator. The slurry of ammonia and polymer was poured into a fritted glass filter funnel and the polymer was filtered off. The filter cake was washed three times with water to remove inorganic salts, and dried in a vacuum oven. The product was a white, fluffy powder. A 0.2 gram sample was dissolved in 100 ml. of ethylene dichloride and a reduced specific viscosity was determined. This had a value of .058 liter per gram, which corresponds to a molecular weight of 150,000 as calculated by means of the equation of Baxendale, Bywater, and Evans (Journal Polymer Sci., 1, 237 (1946)) as modified for ethylene dichloride. By way of contrast, a methyl methacrylate polymer prepared in a similar manner, except that only sodium metal was used as the salt-forming alkali metal, has a reduced specific viscosity of .017 liter per gram, corresponding to a molecular weight of 32,000.

*Example 2*

Methyl methacrylate polymer was made by a procedure identical with that of Example 1, except that .591 gram of sodium and .557 gram of lithium were used. This is a mole ratio of .32 to 1, sodium to lithium. Total alkali metal concentration was .071 mole per liter. The polymer had a reduced specific viscosity of .068 liter per gram corresponding to a molecular weight of 180,000.

*Example 3*

Methyl methacrylate polymer was made in an apparatus and by a procedure identical with that of Example 1, except that .466 gram of sodium and .599 gram of lithium were used. This is a mole ratio of .23 to 1, sodium to lithium. Total alkali metal concentration was .071 mole per liter. There were obtained 191 grams of polymer. The polymer had a reduced specific viscosity of .116 liter per gram, corresponding to a molecular weight of 360,000.

*Example 4*

The apparatus described in Example 1 was modified by substitution of a larger vessel so that three liters of catalyst solution could be made. One gram of sodium and one and one-half grams of lithium were used. This is a mole ratio of .201 to 1, sodium to lithium. Total alkali metal concentration was .087 mole per liter. There were used 9.5 ml. of methyl isobutyrate to decolorize the alkali metal. There were added 540 grams of methyl methacrylate monomer and polymerization took place. After the polymer was separated, washed, and dried, it amounted to 489 grams. The polymer had a reduced specific viscosity of .157, corresponding to a molecular weight of 530,000.

*Example 5*

A Pyrex battery jar of approximately nine liters capacity was fitted with a Plexiglas top. The necessary inlets and outlets, as described in Example 1, were added. Six liters of catalyst solution were made by the same procedure as that followed in Example 1. There were used 2.80 grams of sodium and 2.11 grams of lithium. This is a mole ratio of .40 to 1, sodium to lithium, and a total alkali concentration of .071 mole per liter. Methyl isobutyrate was added until the color changed from deep blue to a clear solution with a faint blue tinge. There were added 873 grams of methyl methacrylate monomer which was then polymerized. The polymer was washed three times with deionized water and dried in a vacuum oven. The polymer had a reduced specific viscosity of .044 liter per gram, corresponding to a molecular weight of 111,000.

*Example 6*

A Pyrex battery jar of approximately nine liters capacity was equipped with a Plexiglas top. The necessary inlets and outlets, as described in Example 1, were added. Seven liters of catalyst were made by the same procedure as that followed in Example 1. There were used 3.27 grams of sodium and 2.46 grams of lithium. This is a mole ratio of .400 to 1, sodium to lithium. The alkali metal concentration was .071 mole per liter. To form the alkali metal salts 20 ml. of methyl isobutyrate were used and 873 grams of methyl methacrylate monomer were polymerized. There were separated, washed, and dried 707 grams of polymer. The polymer had a reduced specific viscosity of .042, corresponding to a molecular weight of 99,000.

The properties of methyl methacrylate with this molecular weight are such as to make it a useful molding powder. Some of this material was molded into test bars and physical tests were run. By way of contrast, the same physical tests were run on a conventional commericial methyl methacrylate molding powder and also on a mixture of high molecular weight anionic polymer with low molecular weight anionic polymer. The high molecular weight polymer (.140 reduced specific viscosity, corresponding to a molecular weight of 460,000) was made by an anionic process similar to that described above, except that the catalyst was the single salt of lithium plus methyl isobutyrate. The low molecular weight polymer (0.17 reduced specific viscosity, corresponding to a molecular weight of 32,000) was made by an anionic process similar to that described above, except that the catalyst was the single salt of sodium plus methyl isobutyrate.

| | Polymer Initiated by Mixed Salts | Mixture of Low and High Molecular Weight Polymer | Conventional (V-100) |
|---|---|---|---|
| Reduced specific viscosity, liters/gram | 0.042 | 0.043 | 0.043 |
| Charpy unnotched impact, ft. lbs. per ½″ x ½″ bar | 4.9 | 0.5 | 3.3 |
| Heat distortion, ½°/min., 264 p.s.i. in °C | 92 | 92 | 85 |
| Shrinkage 2 hrs., 100° C., mils/inch | 2.4 | 1.4 | 3.0 |
| Flexural Strength, lbs./in.² | 18,000 | 6100 | 16,000 |
| Residual monomer, percent | 0.15 | 1.0 | 2 |

In the above table the polymer shown as a conventional polymer is identified as "V-100." This is a commercially available grade of a colorless, transparent acrylic resin based on methyl methacrylate.

*Example 7*

A series of experiments was run using the apparatus described in Example 1. The salts of the sodium and lithium were formed by bubbling oxygen through the metal solution until the blue solution became clear. The total alkali metal concentration was maintained constant at .071 mole per liter. The ratio of sodium to lithium was varied as indicated. Methyl methacrylate monomer was polymerized and the polymer treated as in Example 1. The values obtained for reduced specific viscosity R.S.V. are as tabulated. The molecular weights were calculated as in Example 1.

| Experiment Number | Calculated Mol. Wt. of Polymer | Mole Ratio, Na/Li | R.S.V. Polymer, Liters/gram |
| --- | --- | --- | --- |
| HW 5-17 | 100,000 | .584/1 | .043 |
| HW 3-43 | 130,000 | .494/1 | .052 |
| HW 3-60 | 180,000 | .400/1 | .068 |
| HW 4-26 | 310,000 | .351/1 | .104 |
| HW 5-16 | 740,000 | .268/1 | .21 |

Example 8

A series of runs was made similar to those in Example 7, except that the total alkali metal concentration was maintained at .214 mole per liter. The R.S.V. values for the polymers varied as shown below. The molecular weights were calculated as in Example 1.

| Experiment Number | Calculated Mol. Wt. of Polymer | Mole Ratio, Na/Li | R.S.V. Polymer, Liters/gram |
| --- | --- | --- | --- |
| HW 5-18 | 71,000 | .590/1 | .032 |
| HW 3-85 | 85,000 | .493/1 | .037 |
| HW 4-6 | 150,000 | .397/1 | .059 |
| HW 5-34 | 1,100,000 | .260/1 | .29 |

Example 9

Methyl methacrylate was polymerized in an apparatus identical with that used in Example 1. There were dissolved 2.46 grams of sodium in one and one-half liters of anhydrous ammonia. Oxygen was bubbled through the solution until the blue color disappeared. There was added 1.89 grams of lithium chloride and the solution was stirred for fifteen minutes. Methyl methacrylate monomer in an amount of 218 grams is added. Polymer formed. Stirring was continued for an hour. Two grams of ammonium chloride were added to neutralize excess initiator and the ammonia was allowed to evaporate overnight. The polymer was washed three times with water to remove inorganic salts and dried in a vacuum oven. The polymer weighed 205 grams and had a reduced specific viscosity of .044 liter per gram, corresponding to a molecular weight of 110,000.

Polymer made with sodium as the only metal under the same conditions has a molecular weight of about 30,000.

Example 10

Methyl methacrylate was polymerized in an apparatus identical with that used in Example 1. There were dissolved 0.682 gram of potassium and .618 gram of lithium in one and one-half liters of anhydrous ammonia. This is a mole ratio of .20 to 1 and a total alkali metal concentration of .071 mole per liter. The mixed salts were formed by the addition of gaseous oxygen to the solution until the blue color disappeared. Addition was made of 94 grams of methyl methacrylate monomer. Polymer formed. The reaction mass is stirred for thirty minutes, after which ammonium chloride was added. Polymer was filtered off, washed with water, and dried in a vacuum oven. It had a reduced specific viscosity of 0.26 liter/gram in ethylene dichloride, corresponding to a molecular weight of 980,000.

By way of contrast, a methyl methacrylate polymer prepared in a similar manner, except that only potassium metal was used as the salt-forming alkali metal, has a reduced specific viscosity of .021, corresponding to a molecular weight of 40,000.

Example 11

Repetition of the procedure of Example 10 with use of 1.37 grams of potassium, 0.489 gram of lithium (a mole ratio of 0.5 to 1), and 218 grams of methyl methacrylate gave a polymer having a reduced specific viscosity of 0.030 liter/gram in ethylene dichloride, corresponding to a molecular weight of 65,000.

Example 12

Methyl methacrylate was polymerized in an apparatus identical with that used in Example 1. There were dissolved 0.421 gram of sodium and 1.77 grams of calcium in one and one-half liters of anhydrous ammonia. Mixed salts were formed by the addition of gaseous oxygen to the metal solution until the color changed from deep blue to bluish white. Then 218 grams of methyl methacrylate monomer was added. Polymer formed. The stirring is continued for a half hour. The polymer is filtered off, washed with water, and dried in a vacuum oven to give 210 grams of product. This had a reduced specific viscosity of .25, corresponding to a molecular weight of 940,000.

By way of contrast, methyl methacrylate polymer prepared in a similar manner, except that only one alkali metal was used to form the salt, has a reduced specific viscosity value of .024 when sodium alone is used as catalyst, and .80 when calcium is used as sole catalyst.

Example 13

Methyl methacrylate was polymerized in an apparatus identical with that used in Example 1 with 0.513 gram of sodium and 1.68 grams of calcium dissolved in one and one-half liters of anhydrous ammonia. The mixed salts were formed by the addition of gaseous oxygen to the metal solution until the color changed from deep blue to bluish white. Then 218 grams of methyl methacrylate monomer were added. Polymer formed. The mixture was stirred for 20 minutes. The ammonia was allowed to evaporate overnight. The polymer was washed three times with water and dried in a vacuum oven. The polymer had a reduced specific viscosity of .083 liter/gram in ethylene dichloride, corresponding to a molecular weight of 230,000.

Example 14

Methyl methacrylate is polymerized in an apparatus identical with that used in Example 1 with 2.44 grams of sodium dissolved in one and one-half liters of anhydrous ammonia. Ethyl acetate was added in small increments until the solution turned from blue to colorless. At this point, 4.09 grams of lithium chloride were added and the solution was stirred for seventeen minutes. Then 218 grams of methyl methacrylate monomer were added. Polymer formed. The mass became too viscous to stir in five minutes. The ammonia was allowed to evaporate overnight. The polymer was washed with water three times and dried in a vacuum oven. The polymer had a reduced specific viscosity of .042 liter/gram in ethylene dichloride. This corresponds to a molecular weight of 99,000.

By way of contrast, a methyl methacrylate polymer prepared in a similar way, except that lithium chloride was not added, had a reduced specific viscosity of .016, corresponding to a molecular weight of 30,000.

Example 15

Methyl methacrylate was polymerized in an apparatus identical with that used in Example 1 with 2.44 grams of sodium dissolved in one and one-half liters of anhydrous ammonia. Methyl isobutyrate was added in small increments until the solution turned from blue to clear. At this point, 4.4 grams of anhydrous calcium chloride were added and the solution was stirred for thirty minutes. Then 94 grams of methyl methacrylate monomer were now added. Polymer formed. The reaction mass was stirred for thirty minutes and then two grams of ammonium chloride were added to neutralize the remaining initiator. The ammonia is filtered from the polymer. The polymer is washed with water and dried in a vacuum oven to give 57 grams of dry polymer with a reduced specific viscosity of 0.097 liter/gram in ethylene dichloride. This corresponds to a molecular weight of 290,000.

Repetition of the above procedure with substitution of an equivalent amount of anhydrous strontium chloride or barium chloride for the above calcium chloride produces a very similar polymer. It is thus evident that these alkaline earth metals have the same effect in the initiating sytem.

Example 16

Methyl methacrylate was polymerized in an apparatus identical with that used in Example 1 with 0.594 gram of sodium and .564 gram of lithium dissolved in one and one-half liters of anhydrous ammonia. This is a mole ratio of .32 to 1. Methyl isobutyrate was added in small increments until the solution turned from blue to clear. The bath surrounding the reaction vessel was raised to −40° C. The reaction vessel was stirred for twenty-seven minutes. Then 218 grams of methyl methacrylate monomer was added. Polymer formed. Stirring was continued for thirty minutes. Two grams of ammonium chloride was added. The polymer was washed with water and dried in a vacuum oven. The product weighed 195 grams and had a reduced specific viscosity of .081 liter/gram in ethylene dichloride. This corresponds to a molecular weight of 220,000.

Example 17

Methyl methacrylate was polymerized in an apparatus identical with that used in Example 1 with 0.633 gram of sodium and .553 gram of lithium dissolved in one and one-half liters of anhydrous ammonia. This is a mole ratio of .345 to 1. Acetonitrile was added in small increments until the color changed to a bluish white. Then 218 grams of methyl methacrylate monomer was added. Polymer formed. The reaction mass was stirred for thirty minutes. Two grams of ammonia chloride was added to neutralize remaining initiator. Ammonia was allowed to evaporate overnight. The polymer was washed with water three times and dried in a vacuum oven. The product weighed 203 grams and had a reduced specific viscosity of .040 liter/gram in ethylene dichloride. This corresponds to a molecular weight of 93,000.

By way of contrast, a methyl methacrylate polymer prepared in a similar way, except that only sodium metal is used as the salt-forming alkali metal, had a reduced specific viscosity of .012 liter/gram in ethylene dichloride, corresponding to a molecular weight of 21,000.

Example 18

A one liter glass vessel was fitted for conducting experiments under substantially anhydrous conditions by inlet and outlet tubes identical with those used in Example 1. Prior to operation, the vessel was flushed with dry nitrogen and 2.0 grams of sodium chloride and .138 gram of lithium were added. A cooling bath was then placed around the vessel. The coolant consisted of solid carbon dioxide chunks in acetone. Thereupon 200 grams of anhydrous ammonia were condensed in the vessel. The cooling bath was removed and the solution of the metal and the salt rose to −33.3° C. Oxygen gas was added until the blue solution had disappeared. Then 40 grams of monomeric methyl methacrylate was added. Polymer formed. After twenty minutes of stirring 0.2 gram of NH₄Cl was added. The polymer was separated from the ammonia by filtration. The polymer was washed with water and dried in a vacuum oven. The polymer had a reduced specific viscosity in ethylene dichloride of 0.389, corresponding to a molecular weight of 1,500,000. By way of contrast, a polymer made in a similar way, except that sodium chloride was not added, has a reduced specific viscosity of .500, corresponding to a molecular weight of 2,000,000.

Repetition of the above procedure with substitution of potassium chloride for the above sodium chloride leads to a very similar polymer.

The above procedures applied to allyl, undecenyl, or oleyl methacrylate, as typical alkenyl methacrylates, give quite comparable results in forming polymers of intermediate molecular weights. This is also true for alicyclic esters such as cyclohexyl or isobornyl methacrylate and also for the benzyl and phenyl esters of methacrylic acid.

Example 19

Ethyl acrylate was polymerized in an apparatus identical with that used in Example 1. To the flask was added 0.577 gram of sodium and 0.202 gram of calcium. This is a mole ratio of 5 to 1, sodium to calcium. One and one-half liters of anhydrous liquid ammonia were condensed in the flask. The mixed salts were formed by the addition of gaseous oxygen to the solution until the solution turned from blue to white. When 107 grams of ethyl acrylate were added, polymer was observed to form. The ammonia was decanted off. The polymer weight was 74 grams. It was purified by dissolving in benzene, filtering, and freeze-drying. The polymer had a reduced specific viscosity in ethylene dichloride of 0.039 liter per gram at a concentration of two grams per liter. This corresponds approximately to a molecular weight of 110,000.

By way of contrast an ethyl acrylate polymer prepared in a similar manner except that only sodium was used as the metal is a viscous liquid with a molecular weight of 5,000. Also by way of contrast an ethyl acrylate polymer prepared in a similar manner except that only calcium was used as the metal is a polymer with a reduced specific viscosity of 0.10 corresponding approximately to a molecular weight of 370,000.

Example 20

Butyl methacrylate was polymerized in an apparatus identical with that used in Example 1. To the flask was added 0.40 gram of sodium and 0.40 gram of lithium. This is a mole ratio of .3 to 1, sodium to lithium. One and one-half liters of anhydrous liquid ammonia were condensed in the flask. The mixed salts were formed by adding small increments of methyl isobutyrate until the solution changed from blue to clear. This required two ml. of methyl isobutryate. When 69 grams of butyl methacrylate were added, polymer was observed to form. The ammonia was decanted off. The weight of polymer was 64 grams. It was purified by dissolving in benzene, filtering, freezing, and subliming the frozen benzene. The polymer had a reduced specific viscosity of 0.058 liter per gram at a concentration of two grams per liter in ethylene dichloride. This corresponds approximately to a molecular weight of 270,000.

Example 21

Butyl acrylate was polymerized in an apparatus identical with that used in Example 1. To the flask was added 0.58 gram of sodium and 0.20 gram of calcium. This is a mole ratio of 5 to 1, sodium to calcium. One and one-half liters of anhydrous ammonia were condensed in the flask. The mixed salts were formed by the addition of gaseous oxygen to the solution until the solution turned from blue to white. When 69 grams of butyl acrylate was added, polymer was observed to form. The ammonia was decanted off. The polymer weighed 55 grams. It was purified by dissolving in benzene, filtering, and freeze-drying. The polymer had a reduced specific viscosity of 0.042 liter per gram at a concentration of two grams per liter of ethylene dichloride. This corresponds approximately to a molecular weight of 120,000.

Application of the above process to the other acrylic acid esters demonstrates that polymers of intermediate molecular weight are regularly obtained with the prescribed mixture of catalysts. Thus, there can be used with like outcome alkenyl acrylates such as allyl, crotyl, or oleyl acrylates or phenyl or benzyl or alicyclic acrylates including dicyclopentenyl, cyclohexyl, and isobornyl acrylates.

I claim:

1. A process for preparing polymers of molecular weights between about 90,000 and about 1,000,000 which comprises polymerizing in liquid ammonia under anhydrous conditions below 0° C., an ester of an acid from the class consisting of acrylic and methacrylic acids and of a monohydric alcohol having the non-hydroxyl portion from the class consisting of alkyl groups of not over eight carbon atoms, alkenyl groups of three to eighteen carbon atoms, benzyl groups, phenyl groups, and alicyclic hydrocarbon groups up to ten carbon atoms under the influence of a mixture of polymerization catalysts, said mixture containing an alkali metal catalyst having an atomic weight from about 23 to about 39 and a second catalyst based on a metal from the class consisting of lithium, calcium, strontium, and barium, at least one of these catalysts being a salt of an acid of pKa from 16 to 36, the ratio of the said alkali metal catalyst to the said second catalyst on the basis of metal atoms therein being from about 0.6:1 to 0.1:1 when methacrylic acid esters are polymerized and from about 10:1 to 1:1 when acrylic acid esters are polymerized.

2. A process for preparing polymers of intermediate molecular weights which comprises polymerizing under anhydrous conditions in liquid ammonia between —10° and —90° C. an alkyl methacrylate the alkyl group of which contains not over eight carbon atoms, under the influence of a mixture of polymerization catalysts, said mixture containing an alkali metal catalyst having an atomic weight from about 23 to about 39 and a second catalyst based on a metal from the class consisting of lithium, calcium, strontium, and barium, at least one of these catalysts being a salt of an acid of pKa from 16 to 36, the ratio of the said alkali metal catalyst to the said second catalyst on the basis of metal ions therein being from about 0.6:1 to 1:1.

3. A process for preparing polymers of intermediate molecular weights which comprises polymerizing under anhydrous conditions in liquid ammonia between —10° and —90° C. an alkyl acrylate, the alkyl group of which contains not over eight carbon atoms, under the influence of a mixture of polymerization catalysts, said mixture containing an alkali metal catalyst having an atomic weight from about 23 to about 39 and a second catalyst based on a metal from the class consisting of lithium, calcium, strontium, and barium, at least one of these catalysts being a salt of an acid of pKa from 16 to 36, the ratio of the said alkali metal catalyst to the said second catalyst on the basis of metal ions therein being from about 10:1 to 1:1.

4. A process for preparing poly(methyl methacrylate) of a molecular weight between 90,000 and 1,000,000 which comprises polymerizing under anhydrous conditions in liquid ammonia between about —30° and —70° C. methyl methacrylate under the influence of a mixture of polymerization catalysts, said mixture containing an alkali metal catalyst having an atomic weight of from about 23 to about 39 and a second catalyst based on a metal from the class consisting of lithium, calcium, strontium, and barium, at least one of these catalysts being a salt of an acid of pKa from 16 to 36, the ratio of the said alkali metal catalyst to the said second catalyst on the basis of metal ions therein being from about 9.5:1 to 0.2:1.

5. A process for preparing poly(butyl methacrylate) of a molecular weight between 90,000 and 1,000,000 which comprises polymerizing under anhydrous conditions in liquid ammonia between about —30° and —70° C. butyl methacrylate under the influence of a mixture of polymerization catalyst, said mixture containing an alkali metal catalyst having an atomic weight of from about 23 to about 39 and a second catalyst based on a metal from the class consisting of lithium, calcium, strontium, and barium, at least one of these catalysts being a salt of an acid of pKa from 16 to 36, the ratio of the said alkali metal catalyst to the said second catalyst on the basis of metal ions therein being from about 0.5:1 to 0.2:1.

6. A process for preparing poly(ethyl acrylate) of a molecular weight between 90,000 and 1,000,000 which comprises polymerizing under anhydrous conditions in liquid ammonia between about —30° and —70° C. ethyl acrylate under the influence of a mixture of polymerization catalysts, said mixture containing an alkali metal catalyst having an atomic weight of from about 23 to about 39 and a second catalyst based on a metal from the class consisting of lithium, calcium, strontium, and barium, at least one of these catalysts being a salt of an acid of pKa from 16 to 36, the ratio of the said alkali metal catalyst to the said second catalyst on the basis of metal ions therein being from about 6:4 to 4:1.

7. A process for preparing poly(butyl acrylate) of a molecular weight between 90,000 and 1,0000,000 which comprises polymerizing under anhydrous conditions in liquid ammonia between —30° and —70° C. butyl acrylate under the influence of a mixture of polymerization catalysts, said mixture containing an alkali metal catalyst having an atomic weight from about 23 to about 39 and a second catalyst based on a metal from the class consisting of lithium, calcium, strontium, and barium, at least one of the catalysts being a salt of an acid of pKa from 16 to 36, the ratio of the said alkali metal catalyst to the said second catalyst on the basis of metal ions therein being from about 6:4 to 4:1.

8. A process for preparing poly(methyl methacrylate) of a molecular weight betwen 90,000 and 1,000,000 which comprises polymerizing under anhydrous conditions in liquid ammonia between about —30° and —70° C. methyl methacrylate under the influence of a mixture of polymerization catalysts, said mixture containing a sodium catalyst and a lithium catalyst, at least one of these catalysts being a salt of an acid of pKa from 16 to 36, the ratio of sodium catalyst to lithium catalyst on the basis of metal ions being from 9.5 to 1 to 0.2 to 1.

9. A process according to claim 8 in which the said salts of the said acid are amides.

10. A process according to claim 8 in which the said acid of pKa from 16 to 36 is methyl isobutyrate.

References Cited in the file of this patent

UNITED STATES PATENTS 2,608,555    Bullitt    Aug. 26, 1952